United States Patent
Wu et al.

(10) Patent No.: US 8,331,023 B2
(45) Date of Patent: Dec. 11, 2012

(54) ADJUSTABLE PARALLAX BARRIER 3D DISPLAY

(75) Inventors: Sung-Yang Wu, Hsinchu (TW); Wan-Yu Chen, Taipei County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 701 days.

(21) Appl. No.: 12/205,905

(22) Filed: Sep. 7, 2008

(65) Prior Publication Data
US 2010/0060983 A1  Mar. 11, 2010

(51) Int. Cl.
*G02B 27/22* (2006.01)
*H04N 13/04* (2006.01)
(52) U.S. Cl. ............ 359/464; 359/462; 348/51; 348/54
(58) Field of Classification Search .................. 359/462, 359/464; 348/51, 54
See application file for complete search history.

(56) References Cited

U.S. PATENT DOCUMENTS

| | | | |
|---|---|---|---|
| 3,358,079 A | 12/1967 | Banning, Jr. | |
| 5,315,377 A * | 5/1994 | Isono et al. | 348/51 |
| 5,808,792 A | 9/1998 | Woodgate | |
| 5,855,425 A * | 1/1999 | Hamagishi | 353/7 |
| 6,307,585 B1 * | 10/2001 | Hentschke | 348/51 |
| 2005/0243253 A1 | 11/2005 | Imai et al. | |

* cited by examiner

*Primary Examiner* — Audrey Y Chang
(74) *Attorney, Agent, or Firm* — Winston Hsu; Scott Margo

(57) ABSTRACT

A parallax barrier 3D display utilizes adjustable at least one parallax barrier for having an observer always retrieve stereo vision no matter whether horizontal or vertical movements towards the parallax barrier 3D display are made. The parallax barrier is adjustable in its width and a distance from the parallax barrier 3D display, or a parallax barrier having an appropriate width or distance may be chosen from each parallax barrier set. Therefore, the observer does not have to search for sweet spots nor keep on staying at the sweet spots for retrieving stereo vision.

13 Claims, 8 Drawing Sheets

ADJUSTABLE PARALLAX BARRIER 3D DISPLAY

BACKGROUND OF THE INVENTION

1. Field of the Invention

The present invention relates to an adjustable parallax barrier 3D display, and more particularly, to an adjustable parallax barrier 3D display.

2. Description of the Prior Art

Generally speaking, an image seen by the left eye of the observer is quite different than an image seen by the right eye of the observer, where the image seen by the left eye is often referred as a left view or a left-eye image, and the image seen by the right eye is often referred as a right view or a right-eye image. In the current technology trend, 3D Video display devices are wildly used. Taking stereoscopic display for example, there are Red-Cyan anaglyph glasses, liquid crystal display shutter (LCD-shutter) glasses, and a micro retarder with polarized glasses.

A display cooperating with LCD-shutter glasses displays a left-eye image and a right-eye image within a tiny time-frame, where the left-eye image is retrieved from various viewpoints of the left eye, and the right-eye image is retrieved from various viewpoints of the right-eye. Then the LCD-shutter glasses hinders the left-eye image from being seen by the right eye of the observer, and hinders the right-eye image from being seen by the left eye of the observer. The LCD-shutter glasses make use of visual persistence by displaying an amount of images having lots of right-eye images and left-eye images within a tiny time, and the stereo vision of the observer is thereby generated by alternatively displaying left-eye images and right-eye images in turn rapidly. A micro-retarder with polarized glasses filters images having different poles so that extreme images are observed. For example, an extreme left-eye image is observed by the left eye of the observer without being interleaved with right-eye images, and an extreme right-eye image is observed by the right eye of the observer without being interleaved with left-eye images. Red-Cyan anaglyph glasses use glasses of different colors for filtering off specific colors, and combines images filtered off the specific colors again for generating the stereo vision for the observer.

There are some 3D video display devices other than glasses that are utilized for generating stereo vision, such as a two-view 3D-LCD and a multi-view 3D LCD. A two-view 3D-LCD simply makes use of left-eye images and right-eye images.

Please refer to FIG. 1, which is a diagram for illustrating basics of parallax barriers used on an LCD display. A location 102 indicates where a left eye of an observer stays, and a location 104 indicates where a right eye of the observer stays. Both left-eye images 106 and right-eye images 108 are displayed on a display. Parallax barriers 110 are disposed between the locations 102 and 104 and the images 106 and 108 for refracting lights emitted from the images 106 and 108. With the aid of refraction generated from a parallax barrier 110, as shown in FIG. 1, lights emitted from a left-eye image 106 is hindered by the parallax barrier 110 from reaching the location 104, and lights emitted from a right-eye image 108 is hindered by the parallax barrier 110 from reaching the location 102. Therefore, stereo vision may thus be observed by the observer. According to descriptions in FIG. 1, sweet spot for locating eyes of the observer are pre-defined. However, the stereo vision cannot be observed by the observer when eyes of the observer move away from the defined sweet spots.

Please refer to FIG. 2, which is a schematic diagram for illustrating sweet spots according to FIG. 1. As shown in FIG. 2, an extent of a left eye feasible region, which corresponds to the location 102 shown in FIG. 1, indicates the fact that when the left eye of the observer stays within said region, the left eye observes merely left-eye images on the LCD display. Similarly, an extent of a right eye feasible region, which corresponds to the location 104 shown in FIG. 1, indicates the fact that when the right eye of the observer stays within said region, the right eye observes merely right-eye images on the LCD display. The abovementioned sweet spots lie in the extents of the left eye feasible region and the right eye feasible region, and also the extents of the sweet spots distance from the LCD display with a predetermined viewing distance d, which is also illustrated in FIG. 2. However, when eyes of the observer leave extents of the sweet spots, no stereo vision is observed by the observer. Therefore, every time when activating the LCD display, the observer has to find the sweet spots again, making it inconvenient to the observer. Moreover, even if the sweet spots are found, the observer still has to ensure that his or her eyes stay at the sweet spots, and it is cumbersome for the observer.

SUMMARY OF THE INVENTION

The claimed invention discloses an adjustable parallax barrier 3D display. The parallax barrier 3D display comprises a display, a main parallax barrier disposed in front of the display, a tracking system for tracking locations of both eyes of an observer in front of the main parallax barrier, and a controller for computing at least one of 3D display parameters according to the track locations of the eyes, wherein the main parallax barrier is adjusted according to the at least one of 3D display parameter to shelter a left-eye image being seen by a left eye of the observer and shelter a right-eye image being seen by a right eye of the observer.

These and other objectives of the present invention will no doubt become obvious to those of ordinary skill in the art after reading the following detailed description of the preferred embodiment that is illustrated in the various figures and drawings.

DETAILED DESCRIPTION

Therefore, an adjustable parallax barrier 3D display apparatus/method are disclosed in the present invention for having the observer perceive stereo vision without reducing resolutions while the observer is moving horizontally or vertically towards the display.

Figure 1:
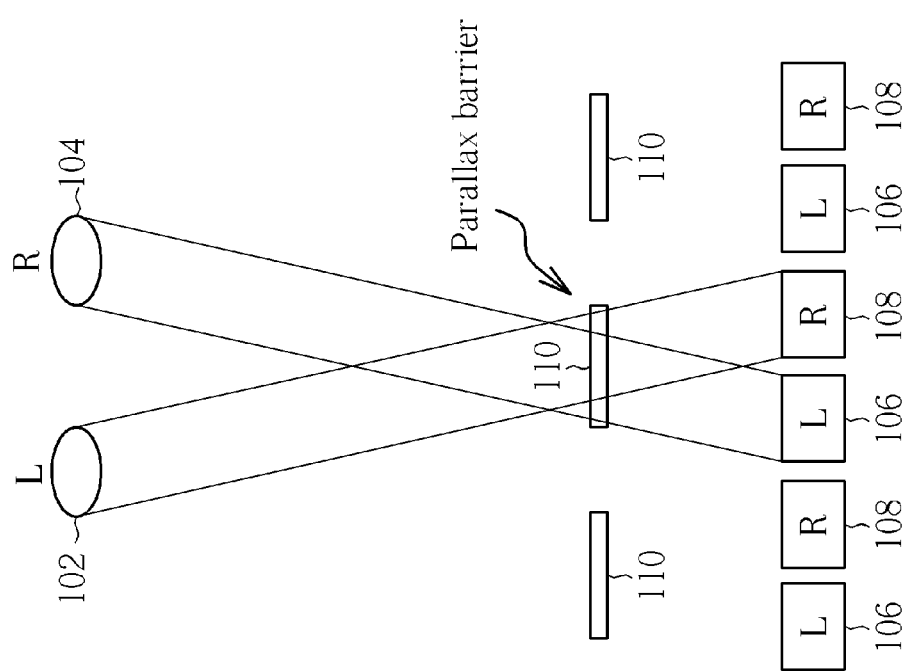
FIG. 1 is a diagram for illustrating basics of parallax barriers used on an LCD display.
Figure 2:
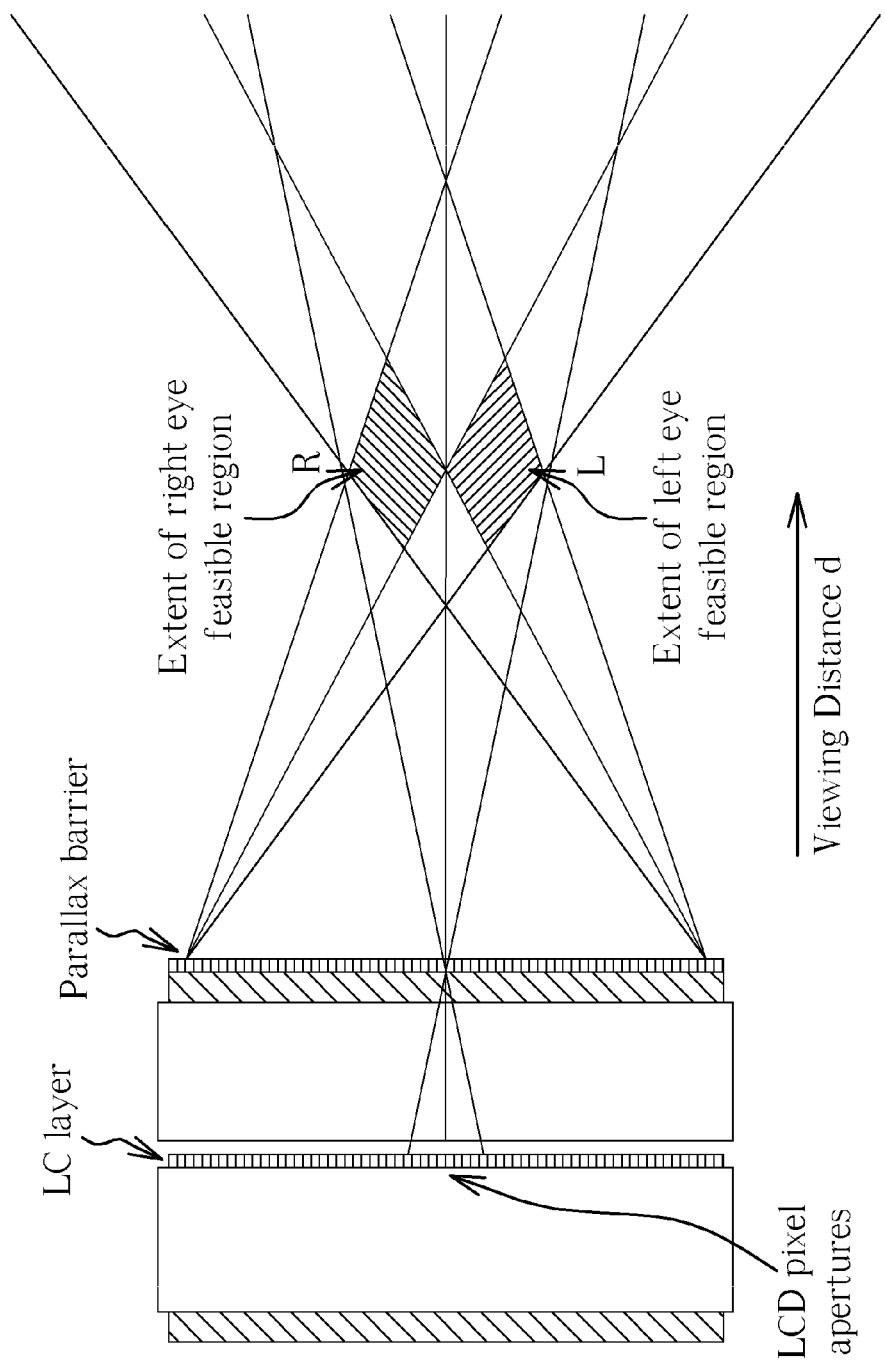
FIG. 2 is a schematic diagram for illustrating sweet spots according to FIG. 1.
Figure 3:
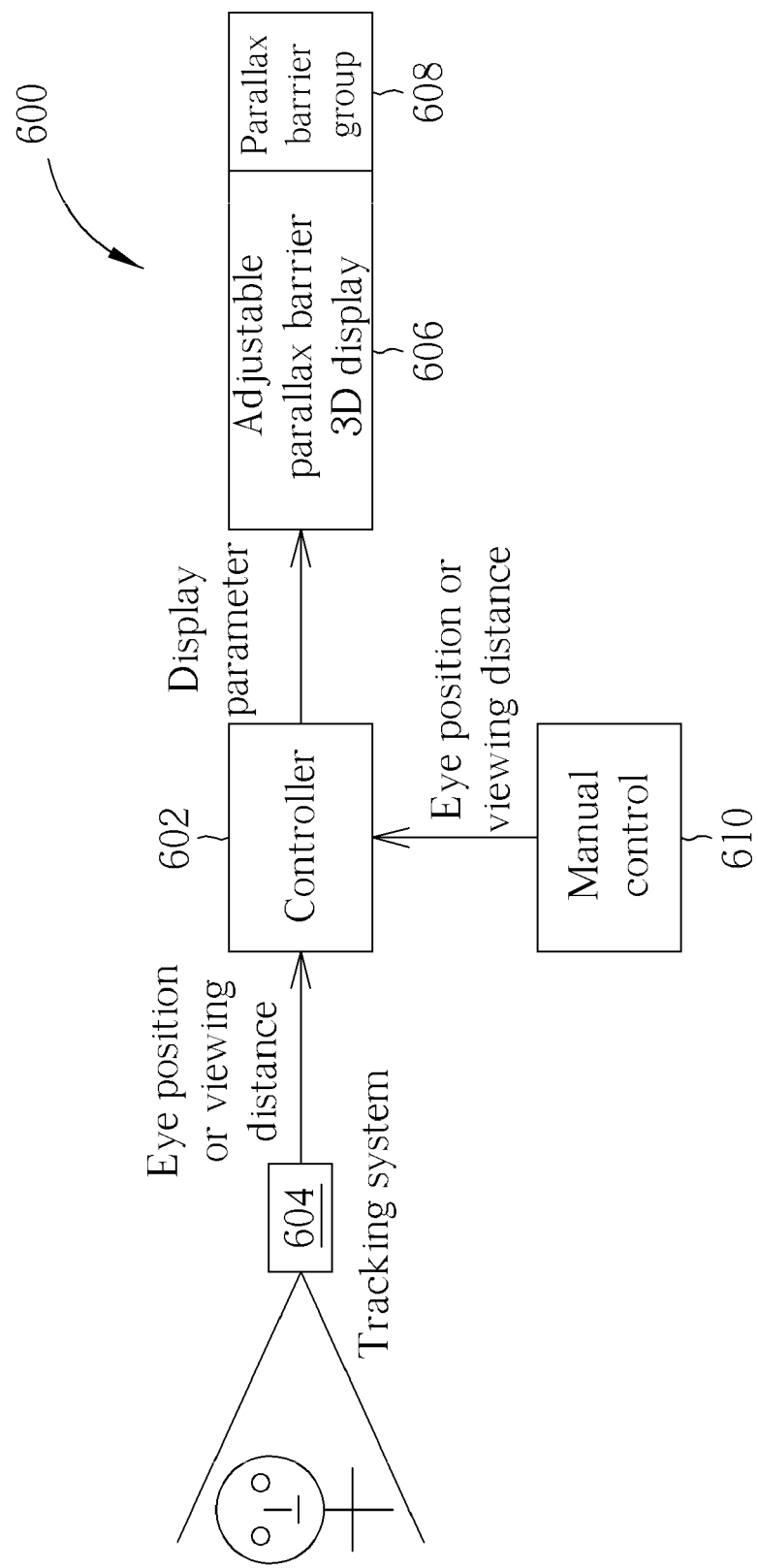
FIG. 3 is a block diagram of a parallax barrier 3D display of the present invention.
Figure 4:
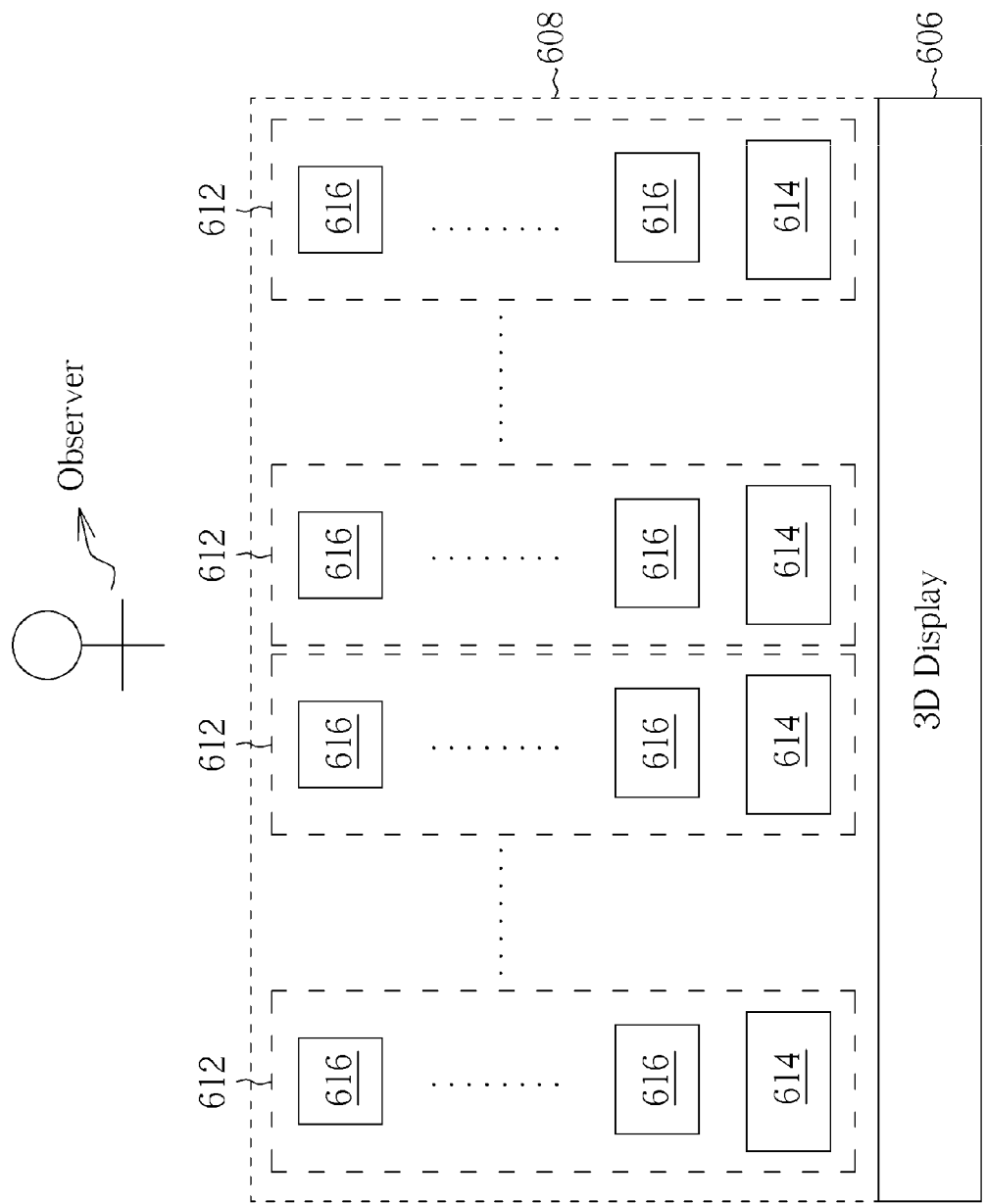
FIG. 4 is a detailed diagram of the parallax barrier group shown in FIG. 3.

Please refer to FIG. 3, which is a block diagram of a parallax barrier 3D display 600 of the present invention. The parallax barrier 3D display 600 includes a controller 602, a tracking system 604, a 3D display 606, and a parallax barrier group 608. FIG. 4 is a detailed diagram of the parallax barrier group 608 shown in FIG. 3. The parallax barrier group 608 includes a plurality of parallax barrier sets 612 disposed in a parallel manner in front of the 3D display 606. Each parallax barrier set 612 includes a main parallax barrier 614 and at least one secondary parallax barrier 616, where a width of the main parallax barrier 614 is greater than a width of any of the at least one secondary parallax barriers 616. When a plurality of the at least one secondary parallax barriers 616 are utilized, the at least one secondary parallax barriers 616 are arranged in an increasing order of width, as shown in FIG. 4, such that the at least one secondary parallax barrier 616 having the greatest width nearest to the 3D display 606 and the at least one secondary parallax barrier 616 having the smallest width most distant from the 3D display 606. In an embodiment of the present invention, the secondary parallax barriers 616 are not included in the parallax barrier sets 612, i.e., each parallax barrier set 612 merely includes the main parallax barrier 614.

Note that the position of the observer is also illustrated in FIG. 4 so that the parallax barrier group 608 is disposed between the 3D display 606 and the observer. When the 3D display 606 is watched by the observer, merely one parallax barrier in each parallax barrier set 612 is activated by the controller 602, whereas other unutilized parallax barriers are turned off by the controller 602. The tracking system 604 is utilized for tracking locations of both eyes of the observer, i.e., the position of the observer. In addition, the tracking system 604 is able to not only to track the horizontal eye position, but also the vertical distance from the eyes of observer to the 3D display 606. The controller 602 is also utilized for receiving the locations tracked by the tracking system 604, and for computing at least one of parameters. The parameters may comprise a shaded area of each parallax barrier set 612 corresponding to the 3D display 606, a distance between a parallax barrier in each parallax barrier set 612 and the 3D display 606, and the refractive index of parallax barriers. In general, when refractive index of parallax barrier in the parallax barrier group 608 is varying, i.e., refraction of said parallax barrier may be adjusted; the controller 602 is also utilized for calculating the refractive index of said parallax barrier. The controller 602 is also responsible for computing a shaded area of each parallax barrier set 612 corresponding to the 3D display 606 for maintaining good shading and good transparency, where the shaded area indicates the area of a parallax barrier, and may be directly calculated according to a width of the parallax barrier since the parallax barrier used in the present invention may be assumed to be square in shape. A primary aim of the parallax barrier 3D display 600 is to have a left-eye image corresponding to each parallax barrier set 612 to be sheltered (or shaded) from being seen by the right eye of the observer, and have a right-eye image corresponding to each parallax barrier set 612 to be sheltered (or shaded) from being seen by the left eye of the observer. The parallax barrier 3D display 600 may further include a manual controller 610 for activating a chosen parallax barrier in each parallax barrier group 608.

For briefly explaining functions of the parallax barrier 3D display 600 of the present invention, the following descriptions are primarily based on the assumption that merely the main parallax barrier 614 in each parallax barrier set 612 is utilized except for when the at least one secondary parallax barrier 616 is particularly demonstrated to be included in each parallax barrier set 612.

Figure 5:
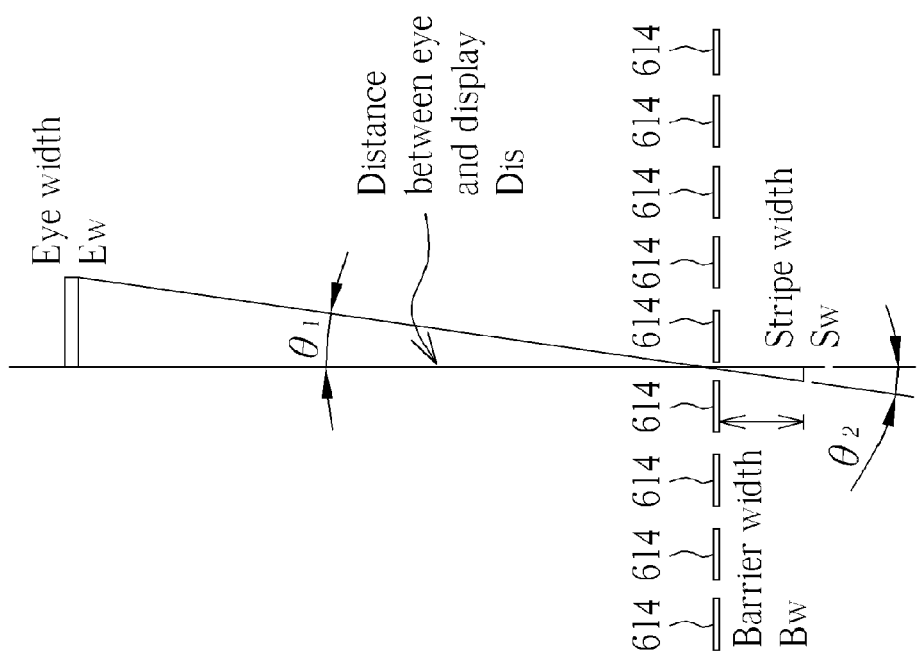
FIG. 5 is a diagram illustrating how an optimal distance between a main parallax barrier shown in FIG. 4 and the 3D display is determined according to a vertical position of the observer towards the 3D display.

Please refer to FIG. 5, which is a diagram illustrating how an optimal distance between a main parallax barrier 614 shown in FIG. 4 and the 3D display 606 is determined according to a vertical position of the observer towards the 3D display 606. As shown in FIG. 5, a distance between a main parallax barrier 614 and the 3D display 606, also referred to as a barrier width, is $B_W$. A stripe width $S_W$ is defined by the width of a left-eye image or a right-eye image formed on the 3D display 606, and may be adjusted since the width of the left-eye image or the right-eye image is adjustable. Note that the stripe width $S_W$ may be adjusted according to a lateral position of the observer since both viewing angles $\theta_1$ and $\theta_2$ vary accordingly, i.e., the width of the images on the 3D display 606 may be directly adjusted. A distance between the observer and the 3D display 606 is Dis, which is variable since the vertical position of the main parallax barrier 614 towards the 3D display 606 can be adjusted. An eye width between the two eyes of the observer is $E_W$. According to Snell's Law, an optimal width of the barrier width $B_W$ may be denoted as:

$$B_W = S_W * (Dis/E_W) \qquad (1)$$

Note that the refractive index inside the 3D display 606 is assumed to be 1, which is also the refractive index of air so that refractive indexes internal and external to the 3D display are assumed to be the same. Horizontal movements of the observer do not disturb the observer from seeing stereo vision since the stripe width $S_W$ may be adjusted accordingly by adjusting widths of images on the 3D display 606. Following the equation (1), the barrier width $B_W$ may be dynamically adjusted according to the variable distance Dis and the variable stripe width $S_W$ so that the observer keeps on retrieving stereo vision. Moreover, when the at least one secondary parallax barrier 616 is applied in each parallax barrier set 612, even when an appropriate utilized parallax barrier among each parallax barrier set 612 other than the main parallax barrier 614 is chosen, the barrier width $B_W$ between the 3D display 606 and the utilized parallax barrier may still be dynamically adjusted according to the distance Dis and the stripe width $S_W$ as well. Therefore, stereo vision is clearly observed by the observer no matter what vertical or horizontal movement towards the 3D display 606 is made by the observer, i.e., no matter how the distance Dis or the stripe width $S_W$ is changed.

Figure 6:
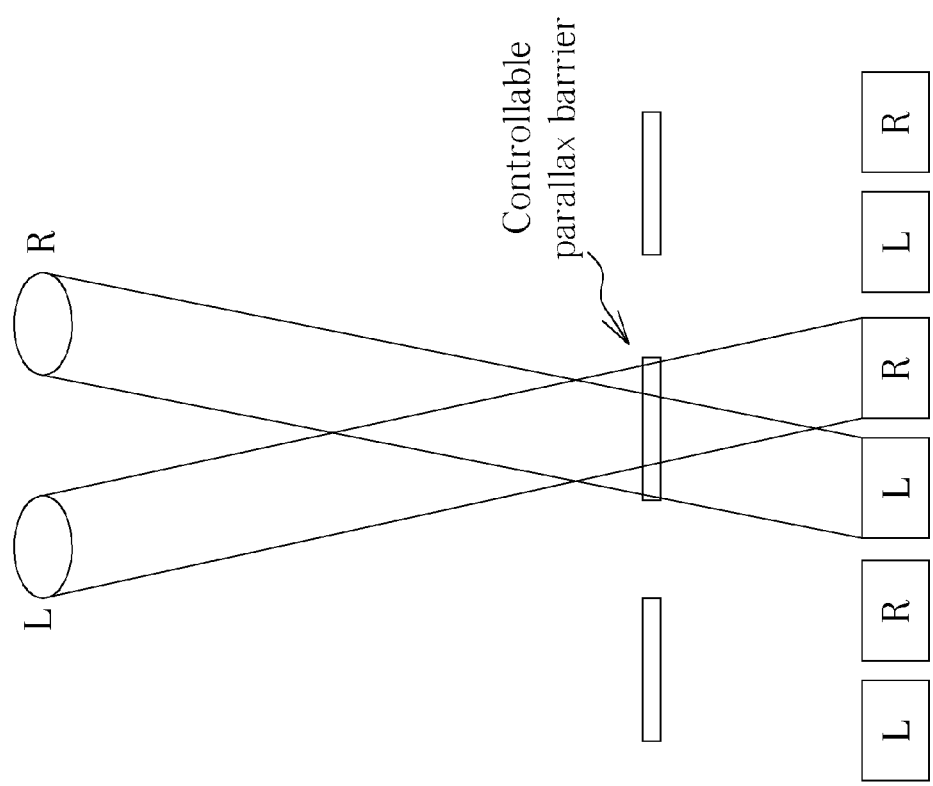
FIG. 6 is a diagram for illustrating how a main parallax barrier shown in FIG. 4 is adjusted in width for reaching good shading and good transparency.

Please refer to FIG. 6, which is a diagram for illustrating how a main parallax barrier 614 shown in FIG. 4 is adjusted in width for reaching good shading and good transparency. For reaching good shading and good transparency, a right-eye image must be sheltered from being observed by the left eye of the observer, whereas a left-eye image must be sheltered from being observed by the right eye of the observer. For retrieving good shading and good transparency, the width of the main parallax barrier 614 has to reach a union of sights of both eyes of the observer, as illustrated in FIG. 6 so as to shelter the left-eye image from being seen by the right eye and the right-eye image from being seen by the left eye of the observer. Note that when the at least one secondary parallax barrier 616 is applied, the abovementioned properties must also be satisfied by the utilized parallax barrier among each parallax barrier set 612.

Figure 7:
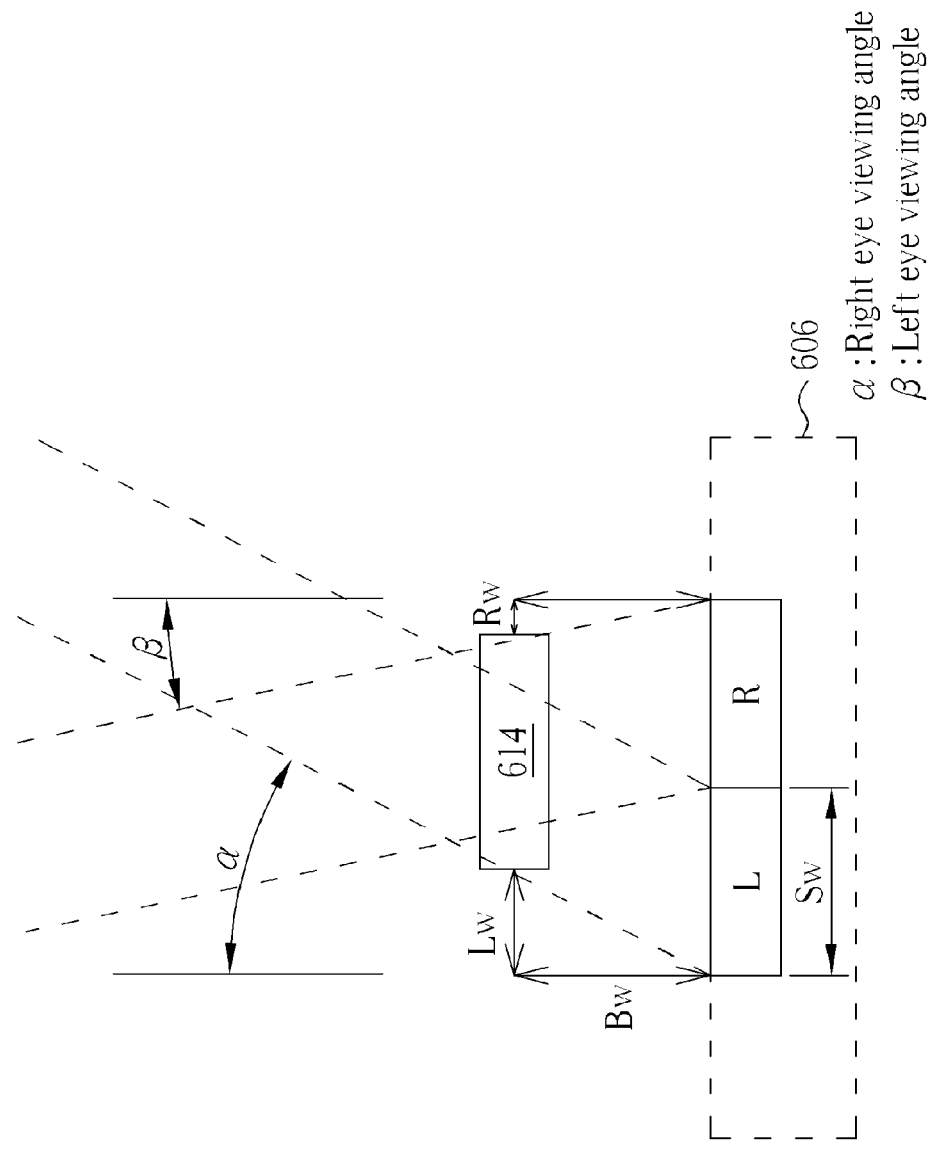
FIG. 7 illustrates how a shaded area of a main parallax barrier shown in FIG. 4 is calculated when a viewing distance is longer than an optimal distance.
Figure 8:
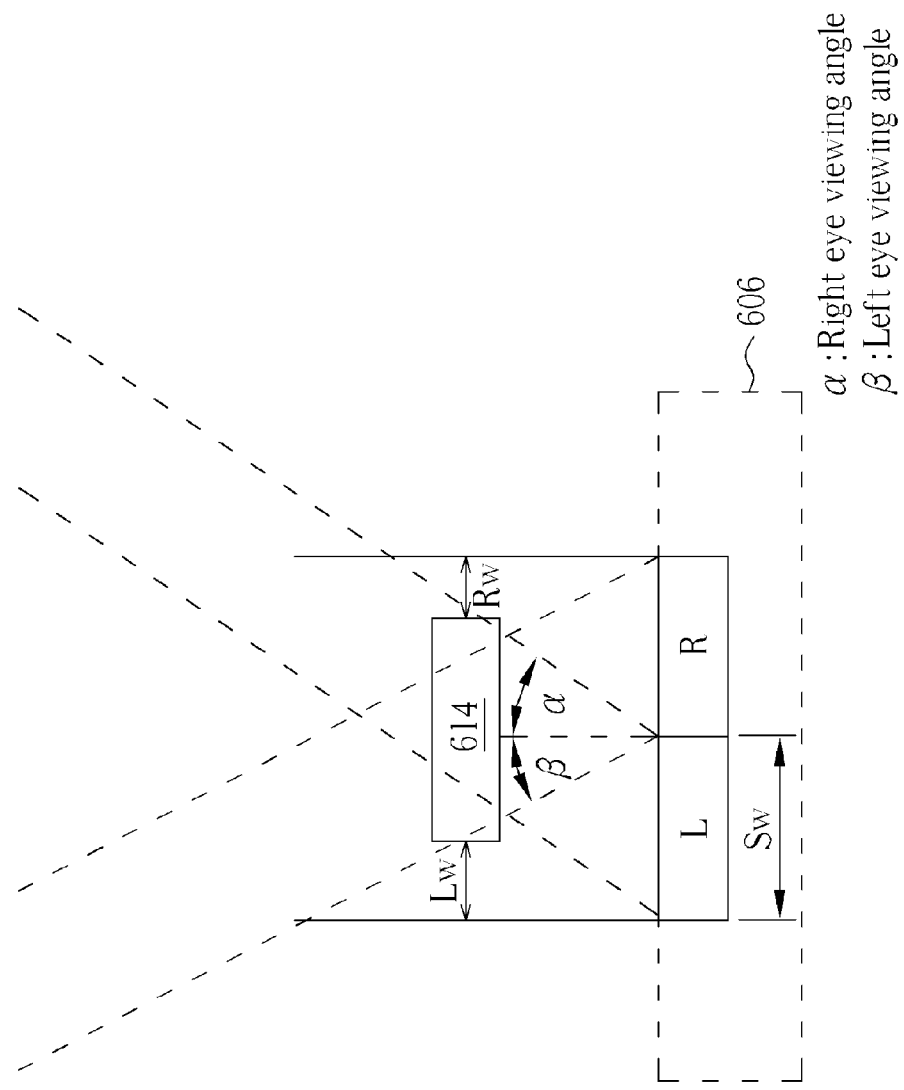
FIG. 8 illustrates how a shaded area of a parallax barrier shown in FIG. 4 is calculated when a viewing distance is shorter than an optimal distance.

Please refer to FIG. 7 and FIG. 8. FIG. 7 illustrates how a shaded area of a main parallax barrier 614 shown in FIG. 4 is calculated when a viewing distance is longer than an optimal distance. FIG. 8 illustrates how a shaded area of a parallax barrier shown in FIG. 4 is calculated when a viewing distance is shorter than an optimal distance. In FIG. 7, a viewing distance, i.e., the distance Dis mentioned in FIG. 5, is longer than an optimal distance, which is defined as an ideal distance for generating stereo vision on the eyes of the observer, and the width of the main parallax barrier 614 may thus be shorter in sheltering unnecessary images from being observed. As shown in FIG. 7, the images labeled with L and R indicate a display unit on the 3D display 606, and widths labeled with $L_W$ and $R_W$ may thus be longer, where the left width $L_W$ is calculated as:

$$L_W = B_W * \tan \alpha \quad (2),$$

and the right width $R_W$ is calculated as:

$$R_W = B_W * \tan \beta \quad (3).$$

The width $B_W$ indicates a distance between the main parallax barrier 614 and the 3D display 606. $\alpha$ indicates a maximal included angle for sheltering a left-eye image from being seen by the right eye of the observer. $\beta$ indicates a maximal included angle for sheltering a right-eye image from being seen by the left eye of observer. Note that a lateral position of the main parallax barrier 614 towards the display unit is adjustable so that the widths $L_W$ and $R_W$ may be adjusted by left-shifting or right-shifting the main parallax barrier 614 within a range of the display unit on the 3D display 606, and the width $W_{PB}$ of the main parallax barrier 614 may be inducted by $$W_{PB} = 2 * S_W - L_W - R_W \quad (4),$$

where $S_W$ indicates the stripe width defined by the width of a left-eye image or a right-eye image, as defined in descriptions of FIG. 5. Moreover, the stripe width $S_W$ may also be adjusted by adjusting widths of images as well. Note that when the at least one secondary parallax barrier 616 is applied in each parallax barrier set 612, the properties of the main parallax barrier 614 may still be replaced by or complemented by the utilized parallax barrier.

Similarly with FIG. 7, in FIG. 8, the viewing distance is shorter than the optimal distance so that the width of the main parallax barrier 614 may be longer in sheltering unnecessary images from being observed. Therefore, widths labeled with $L_W$ and $R_W$ may be shorter, where the left width $L_W$ is calculated as:

$$L_W = S_W - B_W * \tan \beta \quad (5),$$

and the right width $R_W$ is calculated as:

$$R_W = S_W - B_W * \tan \alpha \quad (6).$$

Similar with descriptions in FIG. 7, the width $B_W$ indicates a distance between the main parallax barrier 614 and the 3D display 606. The width $S_W$ indicates a stripe width on the 3D display 606, i.e., a width on the 3D display 606 for displaying a left-eye image or a right-eye image. $\alpha$ indicates a maximal included angle for sheltering a left-eye image from being seen by the right eye of the observer. $\beta$ indicates a maximal included angle for sheltering a right-eye image from being seen by the left eye of observer. Note that the lateral position of the main parallax barrier 614 is adjustable so that the widths $L_W$ and $R_W$ may be adjusted by left-shifting or right-shifting the main parallax barrier 614 within a range of the display unit on the 3D display 606, and the width $W_{PB}$ of the main parallax barrier 614 is calculated by following equation (5). Note that when the at least one secondary parallax barrier 616 is applied in each parallax barrier set 612, the properties of the main parallax barrier 614 may still be replaced by or complemented by the utilized parallax barrier.

According to descriptions in FIG. 7 and FIG. 8, any vertical movement of the observer towards the 3D display 606 does not disturb the observer from retrieving stereo vision in the present invention since the width (and height because the parallax barriers are preferably square) of the main parallax barrier 614 may be adjusted for shading unnecessary images from being erroneously observed. Moreover, when the at least one secondary parallax barrier 616 is applied in each parallax barrier set 612, the utilized parallax barrier of each parallax barrier set 612 may be chosen according to a required width. Therefore, better transparency and shading is achieved by choosing and activating a most appropriate parallax barrier from each parallax barrier set 612. Please note that the algorithm illustrated above is only for illustration purpose, it should not be interpreted as the limitation of the present invention.

With the aid of the parallax barrier 3D display disclosed in the present invention, an observer of the 3D display may retrieve stereo vision no matter whether vertical or horizontal movements towards the 3D display are made. In other words, the tracking system in the present invention can track not only horizontal eye position but also vertical viewing distance, and user is able to derive stereo vision moving both horizontally and vertically.

Therefore, the observer does not have to search for sweet spots nor keep on staying at the sweet spots for retrieving stereo vision anymore. Moreover, since the techniques described above may be applied on each parallax barrier set 612 of the parallax barrier group 614, the resolution of the parallax barrier 3D display of the present invention is not reduced.

Those skilled in the art will readily observe that numerous modifications and alterations of the device and method may be made while retaining the teachings of the invention.

What is claimed is:
1. An adjustable parallax barrier 3D display comprising:
   a display for displaying a left-eye image and a right-eye image;
   a main parallax barrier disposed in front of the display;
   at least one secondary parallax barrier disposed between the main parallax barrier and the eyes of the an observer, the at least one secondary parallax barrier and the main parallax barrier each having a respective width or distance from the observer;
   a tracking system for tracking locations of both eyes of the observer in front of the main parallax barrier; and
   a controller for computing at least one of 3D display parameters according to the tracked locations of the eyes;
   wherein a utilized parallax barrier among the main parallax barrier and the at least one secondary parallax barrier is determined and activated by the controller according to a distance between the eyes of the observer and the display of the adjustable parallax barrier 3D display, wherein the utilized parallax barrier is adjusted according to the at least one of 3D display parameter to shelter the left-eye image from being seen by a right eye of the observer and shelter the right-eye image from being seen by a left eye of the observer.
2. The adjustable parallax barrier 3D display of claim 1, wherein the parameters comprises a shaded area of the main parallax barrier, a distance between the display and parallax barrier, and a refractive index of the main parallax barrier.

3. The adjustable parallax barrier 3D display of claim 2 wherein when a distance between both eyes of the observer and the display is longer than a predetermined distance, a left-eye window $L_W$ for sheltering a left-eye image from being seen by the right eye of the observer is denoted as:

$$L_W=B_W*\tan\alpha,$$

and a right-eye window $R_W$ for sheltering a right-eye image from being seen by the left eye of the observer is denoted as:

$$R_W=B_W*\tan\beta;$$

wherein $B_W$ indicates a distance between the main parallax barrier and the display, $\alpha$ indicates a maximal included angle for sheltering a left-eye image from being seen by the right eye of the observer, and $\beta$ indicates a maximal included angle for sheltering a right-eye image from being seen by the left eye of the observer.

4. The adjustable parallax barrier 3D display of claim 2 wherein when a distance between both eyes of the observer and the display is shorter than a predetermined distance, a left-eye window $L_W$ for sheltering a left-eye image from being seen by the right eye of the observer is denoted as:

$$L_W=S_W-B_W*\tan\beta,$$

and a right-eye window $R_W$ for sheltering a right-eye image from being seen by the left eye of the observer is denoted as:

$$R_W=S_W-B_W*\tan\alpha;$$

wherein $S_W$ indicates a stripe width of the left-eye image or the right-eye image, $B_W$ indicates a distance between the main parallax barrier and the display, $\alpha$ indicates a maximal included angle for sheltering a left-eye image from being seen by the right eye of the observer and determined according to the calculated shaded area, and $\beta$ indicates a maximal included angle for sheltering a right-eye image from being seen by the left eye of the observer and determined according to the calculated shaded area.

5. The adjustable parallax barrier 3D display of claim 1 wherein a distance $B_W$ between the main parallax barrier and the display is denoted as:

$$B_W=S_W*(Dis/E_W)$$

wherein $S_W$, indicates a stripe width of the left-eye image or the right eye image, $E_W$ indicates a distance between the eyes of the observer, and Dis indicates a distance between one of the eyes of the observer and the main parallax barrier.

6. The adjustable parallax barrier 3D display of claim 1 wherein when the distance between the eyes of the observer and the display is lengthened, merely one parallax barrier having a smaller width among the main parallax barrier and the at least one secondary parallax barrier is utilized.

7. The adjustable parallax barrier 3D display of claim 1 wherein when the distance between the eyes of the observer and the display is shortened, merely one parallax barrier having a larger width among the main parallax barrier and the at least one secondary parallax barrier is utilized.

8. The adjustable parallax barrier 3D display of claim 1, wherein the tracking system for tracking locations of both eyes of the observer tracks at least one horizontal position from the display to the eyes of observer, wherein the at least one horizontal position comprises a right-eye horizontal position and a left-eye horizontal position.

9. The adjustable parallax barrier 3D display of claim 1, wherein the tracking system for tracking locations of both eyes of the observer tracks at least one vertical position from the display to the eyes of observer, wherein the at least one vertical position is at least one vertical viewing distance from the display to the eyes of observer.

10. The adjustable parallax barrier 3D display of claim 1, wherein the tracking system for tracking locations of both eyes of the observer tracks at least one horizontal position from the display to the eyes of observer and at least one vertical position from the display to the eyes of observer.

11. The adjustable parallax barrier 3D display of claim 1, wherein the at least one secondary parallax barrier is arranged in an increasing order of respective widths along a direction towards the display.

12. The adjustable parallax barrier 3D display of claim 1, wherein a width of the main parallax barrier is greater than a width of any one of the at least one secondary parallax barrier.

13. The adjustable parallax barrier 3D display of claim 1, wherein merely one parallax barrier among the main parallax barrier and the at least one secondary parallax barrier is utilized while all parallax barriers but the utilized one are turned off.

* * * * *